Jan. 4, 1938.  G. C. PAPENDICK  2,104,095
BAKED LOAF FRACTION PACKAGE AND PACKAGING
Filed Dec. 12, 1936

INVENTOR
Gustav C. Papendick.
BY
ATTORNEY

Patented Jan. 4, 1938

2,104,095

UNITED STATES PATENT OFFICE 2,104,095

BAKED LOAF FRACTION PACKAGE AND PACKAGING

Gustav C. Papendick, University City, Mo.

Application December 12, 1936, Serial No. 115,455

2 Claims. (Cl. 99—173)

This invention relates generally to sliced and unsliced baked loaf packages and packaging and, more particularly, to a certain new and useful improvement in packaging of a fractional section of a sliced or unsliced baked loaf.

In the production of baked articles, such as loaves of bread, labor cost, as is well known, constitutes one of the larger items of expense, and this labor cost is substantially the same for the production of a small loaf as a large loaf. Consequently, under present baking practice, the margin of profit for two one-pound loaves is considerably less than the margin of profit for one two-pound loaf. Since, in recent years, a substantial demand has grown up on the part of housewives for smaller loaves of bread, it will be evident that the baker's margin of profit is seriously diminished by reason of the necessity of diverting a part of his production to satisfy this demand for smaller size loaves.

In addition, this consumer demand for fractional size loaves may vary from day to day, with the result that it is extremely difficult for the baker, in his desire to obviate stale bread and waste, to accurately anticipate or gauge the number of such loaves which he may require on any particular day to meet the demands of his business.

Further, in this same connection, the cross-sectional area of a smaller whole loaf is correspondingly smaller than the cross-sectional area of a larger whole loaf. Hence, the size of the slice which may be cut from the smaller loaf is relatively small and unsuitable for a great many common purposes, such, for instance, as sandwich making and the like.

And it may be also said that a great many individual retailers meet the demand of a customer for a smaller size loaf by sub-dividing a larger loaf and then selling a fractional portion of a loaf, loss to either the retailer or wholesale baker ensuing by reason of the fact that the remaining unsold portion of the loaf frequently becomes stale and unsalable.

My invention, hence, has for its primary object the provision of a baked loaf fraction package and method of packaging that meet and satisfy present domestic conditions, that may be economically produced and practiced, that efficiently enable bakers, both wholesale and retail, to furnish fractional size loaves without the previously attendant reduction in margin of profit, and that may be also employed in providing the housewife with a fractional loaf supplying slices of suitably standard size.

And with the above and other objects in view, my invention resides in the novel features of form, construction, arrangement, and combination of the several parts of the baked loaf fraction package and in the method of packaging the baked loaf fraction, all presently described and pointed out in the claims.

In the accompanying drawing,—

Figure 1:
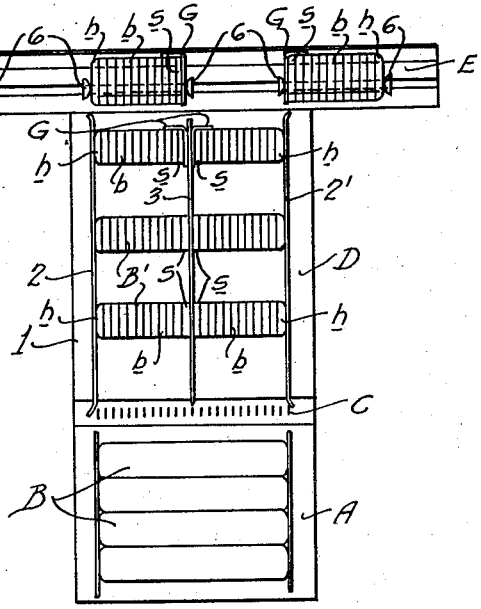
Figure 1 is a substantially diagrammatic plan view of a baked loaf slicing and wrapping machine as preferably constructed and employed in the practicing of the present invention.

Referring now in more detail and by reference characters to the drawing, A designates a loaf conveyer upon which may be disposed a plurality of freshly baked loaves B, which may be fed in any conventional manner through a bread slicing-machine C of any suitable design and discharged as sliced loaves B' upon a suitable sliced loaf conveyer D, from which latter the sliced loaves B' are, in turn, transferred to a wrapping machine intake conveyer E for delivery into a suitable wrapping machine F, which also may be of any conventional form or design.

The sliced loaf conveyer D, for present purposes of illustration, includes a flat discharge table I, rigidly mounted upon which, and at their one or inner end preferably disposed in adjacence to the slicing machine C, is a plurality of longitudinally extending suitably spaced parallel partitions or guides in the present instance three in number, more specifically, end guides or partitions 2, 2', and an intermediate central guide or partition 3, whereby the unsliced loaves B, upon being fed through the slicing machine C, will be discharged upon the table I between the guides 2—3, 3—2', in such manner that the sliced loaf B' will, in effect, be divided, in the present instance, into two identical segments or fractions b, b, each having its one or outer end closed, as it may be said, by a so-called heel h having a relatively hard outer crust, and each having at its other or inner end a so-called open or soft, crustless slice s.

The respective fractional or, in this instance, half loaves b are suitably progressed along the table 1 toward the outer or free end thereof, during which movement a substantially L-shaped end wall or member G is suitably inserted and disposed, manually or otherwise, between the open end slice s of each loaf-segment b and the opposing face of the adjacent guide or partition 3, as best seen in Figure 1, for purposes and in a manner presently more fully described.

Figure 2:
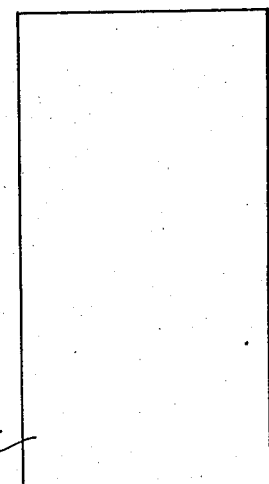
Figure 2 is a perspective view of a fragmental or sectional unit of a sliced baked loaf prior to wrapping, illustrated as equipped with a re-enforcing end wall forming part of the present invention.
Figure 3:
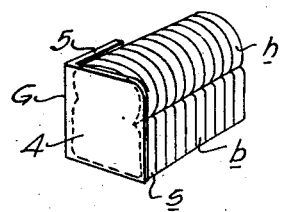
Figure 3 is a plan view of the loaf segment or fraction of Figure 2.
Figure 4:
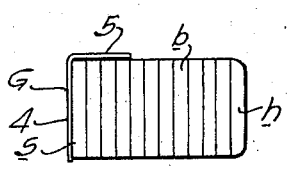
Figure 4 is an elevational view of the loaf segment or fraction of Figures 2 and 3.

Each end wall or member G is preferably constructed of heavy paper, cardboard, or other suitable relatively inexpensive rigid or semi-rigid material and comprises a flat body portion 4 substantially conforming in size and dimension to the cross-sectional area and dimensions of the respective loaf segments b, laterally projecting from which is a preferably integral marginal flange or extension 5 preferably of sufficient length for embracingly engaging several consecutive slices along a selected side margin of the loaf-fraction, as best seen in Figure 2.

Each end wall or member G is preferably inserted against the innermost slice s of the respective loaf sections or units b of the respective sliced loaves B' by positioning the outer face of the body portion 4 firmly against the opposing face of the adjacent guide member 3, with the extension 5 sidewise presented preferably forwardly in the direction of the wrapping machine conveyer E, as shown, so that the end-walls or members G will move forwardly with the respective loaf sections b, as the same are progressed along the discharge table 1.

Figure 5:
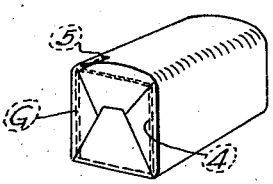
Figure 5 is a perspective view of a wrapped baked loaf fraction package constructed in accordance with and embodying the present invention.

As a pair of the sliced loaf sections b, together with the so disposed end walls or members G, reach the outer end of the table 1, one section b, for instance, may be manually or automatically fed between a pair of suitably spaced pusher or clamping members 6 moving with the wrapping conveyer E for delivering the loaf segment or unit into the wrapping machine F. Simultaneously or successively, the other loaf-fraction b may be manually or automatically moved from the end of the table 1 onto the wrapping machine conveyer E between the next succeeding pair of pushers or clamping members 6. The several loaf sections b are thereupon separately and successively fed with their respective re-enforcing end walls G into the wrapping machine F, wherein each fraction or segment b is wrapped and sealed in a conventional manner, the heel h and the wall G at the opposite ends of each respective loaf-fraction b providing substantially rigid surfaces enabling firm, air-tight wrapper seals, an air- and moisture-proof package comprising merely a loaf fragment or section, as best seen in Figure 5, resulting.

It will be evident that such method of packaging may be applied with equal facility and efficiency to the packaging of fragments of either sliced or unsliced baked loaves. It should, further, be noted in this connection that the respective end walls or members G serve to prevent the escape of moisture from the loaf segment during handling and subsequent delivery to the consumer, provide a firm protecting end structure for preventing damaging, deforming, or puncturing of the open or soft slice s during subsequent handling, and also form a firm rigid foundation for one of the enclosures or seals of the completed package.

By employing the present invention, a baker may thus readily accommodate and supply any consumer demands for fractional size loaves without diminishing his margin of profit and without varying the uniform course of his baking operations and may also provide the consumer with a fractional size loaf which not only is firmly and securely packaged in a sanitary air-and moisture-proof wrapping without any appreciable additional unit cost, but which also possesses the flavor of a full large size loaf; it being a well recognized fact in the baking industry that a large full size loaf of baked bread possesses and retains its flavor in larger degree than does a small loaf.

It should, of course, be understood that, while not here specifically shown, a greater number of intermediate partition or guide members, similar to the member 3, may be employed if it is desired to divide the respective discharged loaves B' into a greater number of fractional segments, in which event a re-enforcing end wall G will be disposed at and upon each soft end of the respective loaf fragments or segments, and that other changes and modifications in the form, construction, arrangement, and combination of the several parts of the package and steps in the method of packaging may be made and substituted for those herein shown and described without departing from the nature and principle of my invention.

Having thus described my invention, what I claim and desire to secure by Letters Patent is,—

1. That method of packaging a sliced baked loaf of bread which comprises progressing the sliced loaf over a conveyor table between a plurality of spaced partitions whereby to sub-divide the loaf into a plurality of fractional loaf-sections each having a soft crustless end-face, disposing a flanged end-wall member flatwise against the partition with its flange portion projecting outwardly with respect to the partition and with its unflanged vertical edge presented toward the progressing loaf section, progressing the loaf section over the unflanged edge of the end-wall member into flatwise end-protecting registration therewith and in contact along a marginal portion of a side-face with the flange-portion of the end-wall member, and further progressing the end-protected loaf section as a unit for wrapping operations.

2. That method of packaging a sliced baked loaf of bread which comprises, progressing the sliced loaf over a conveyor table between a plurality of spaced partitions whereby to sub-divide the loaf into a plurality of fractional loaf-sections each having a soft crustless end face, disposing flatwise against the partition a reinforcing end-wall member having a relatively short flange extending outwardly at right angles thereto so that said flange will project outwardly away from the partition and with its unflanged vertical edge presented toward the progressing loaf section, progressing the loaf section over the unflanged edge of the end-wall member into flatwise end-protecting registration therewith and in contact along a marginal portion of a side-face with the flange portion of the end-wall member, and further progressing the end-protected loaf section as a unit for wrapping operations.

GUSTAV C. PAPENDICK.